United States Patent [19]

Boundy et al.

[11] Patent Number: 4,762,072
[45] Date of Patent: Aug. 9, 1988

[54] DESK AND SPACE DIVIDING WALL PANEL ASSEMBLY

[75] Inventors: Bruce K. Boundy, Holland Township, Ottawa County; Gerald N. Vander Till, Jenison, both of Mich.

[73] Assignee: Westinghouse Electric Corp., Pittsburgh, Pa.

[21] Appl. No.: 916,424

[22] Filed: Oct. 7, 1986

[51] Int. Cl.$^4$ .................................. A47B 35/00
[52] U.S. Cl. ............................ 108/50; 312/194; 52/242
[58] Field of Search ............... 108/50, 48, 108; 312/223, 196, 194, 208; 52/261, 242, 239, 221

[56] References Cited

U.S. PATENT DOCUMENTS

| | | | |
|---|---|---|---|
| 1,727,032 | 9/1929 | Guignon, Jr. | 108/50 X |
| 3,794,397 | 2/1974 | Flototto | 312/194 X |
| 4,094,256 | 6/1978 | Holper et al. | 312/194 X |
| 4,094,561 | 6/1978 | Wolff et al. | 312/223 |
| 4,133,153 | 1/1979 | Hage | 52/242 X |
| 4,163,867 | 8/1979 | Breidenbach | 312/223 X |
| 4,257,203 | 3/1981 | Propst et al. | 52/242 X |
| 4,267,677 | 5/1981 | Randolph et al. | 52/242 |
| 4,323,291 | 4/1982 | Ball | 312/196 X |
| 4,372,629 | 2/1983 | Propst et al. | 312/196 X |
| 4,470,232 | 9/1984 | Condevaux et al. | 52/242 X |
| 4,535,703 | 8/1985 | Henriott et al. | 312/223 X |
| 4,593,505 | 6/1986 | Russell | 52/221 |
| 4,627,364 | 12/1986 | Klein et al. | 312/223 X |
| 4,646,211 | 2/1987 | Gallant et al. | 312/223 X |

FOREIGN PATENT DOCUMENTS

| | | | |
|---|---|---|---|
| 0006707 | 1/1980 | European Pat. Off. | 108/50 |
| 8717183 | 11/1978 | Fed. Rep. of Germany | 312/223 |
| 2916002 | 11/1980 | Fed. Rep. of Germany | 312/223 |

Primary Examiner—Francis K. Zugel
Assistant Examiner—José V. Chen
Attorney, Agent, or Firm—D. R. Lackey

[57] ABSTRACT

An electrified desk and space dividing panel assembly which includes an electrical raceway at the bottoms of the panels, an electrical service trough at back edge of the desk, and an electrical upfeed arrangement which interconnects the electrical power and communication circuits in the raceway with terminal blocks and receptacles in the service trough. The electrical upfeed arrangement, in addition to the electrical cables, includes a housing having telescopically engaged sections which enables the housing to lock to both the service trough and a baseboard cover on the raceway, while simultaneously adjusting the housing to the height of the service trough above floor level. A cover for the service trough includes two or more independent lid assemblies, each of which is mountable in one of four different orientations.

21 Claims, 7 Drawing Sheets

DESK AND SPACE DIVIDING WALL PANEL ASSEMBLY

BACKGROUND OF THE INVENTION

1. Field of the Invention

The invention relates in general to space dividing wall panel arrangements, and more specifically to new and improved arrangements for providing electrical service from the baseboard of such panels to the work surface of an associated desk.

2. Description of the Prior Art

Space dividing wall panel members are used extensively in modern office buildings to provide efficient, comfortable work stations. Most work stations of a modern office require electrical power and telephone service, and many require data communication links between a computer terminal or computer and a centrally located data base. Space dividing wall panel arrangements are easily and quickly installed in a variety of different arrangements, and the electrical services to those work stations which require them must also be just as easily and quickly provided. Further, the provision of the various electrical services to the work stations must be accomplished in an aesthetically pleasing manner.

U.S. Pat. No. 3,762,116 discloses an interior space divider system of the type referred to above. Some electrical arrangements for open office systems utilize wire managers, such as disclosed in U.S. Pat. Nos. 3,759,297 and 4,406,379. More or less permanent concealment of electrical wiring in the baseboards of the space divider panels is disclosed in U.S. Pat. Nos. 3,856,981; 4,278,834 and 4,593,505. Copending application Ser. No. 618,629, filed June 8, 1984, now U.S. Pat. No. 4,634,212 which is assigned to the same assignee as the present application, as are the hereinbefore mentioned patents, discloses a terminal block mounting arrangement for the baseboard of an electrified panel assembly.

Various arrangements for the control and concealment of electrical wiring directly at the user's desk or work station are disclosed in U.K. patent application No. 2,086,148, published May 6, 1982, and in U.S. Pat. Nos. 1,786,823; 3,883,202; 4,094,561; 4,163,867; 4,296,981; 4,372,629; and 4,433,630.

SUMMARY OF THE INVENTION

Briefly, the present invention is a new and improved desk and space dividing wall panel assembly which includes electrified panels having an electrical raceway located in the baseboards of the panels, a desk having a work surface, with the desk being at least partially supported by one or more of the panels, an electrical service trough disposed between the back of the desk and the associated wall panels, and an electrical upfeed which interconnects the electrical services housed in the baseboard with terminal blocks and receptacles in the electrical service trough. A cover for the trough includes a lid which is recessed or indented along one of its edges to define an opening to the trough through which electrical leads may extend from receptacles in the service trough to electrical devices disposed on the work surface, such as a telephone, computer, dictating machines, a printer, and the like. In a preferred embodiment, the cover includes at least two independently mounted lid assemblies, each mountable in one of four different orientations to provide the cable opening at the front or at the rear of the service trough, and to provide a flat surface or a recessed article holding surface. The electrical upfeed includes a housing having telescopically engaged sections which enable the housing to simultaneously lock to both the trough and baseboard while automatically adjusting to the dimension between the baseboard and trough.

BRIEF DESCRIPTION OF THE DRAWING

The invention may be better understood, and further advantages and uses thereof more readily apparent, when considered in view of the following detailed description of exemplary embodiments, in which.

DESCRIPTION OF PREFERRED EMBODIMENTS

Figure 1:
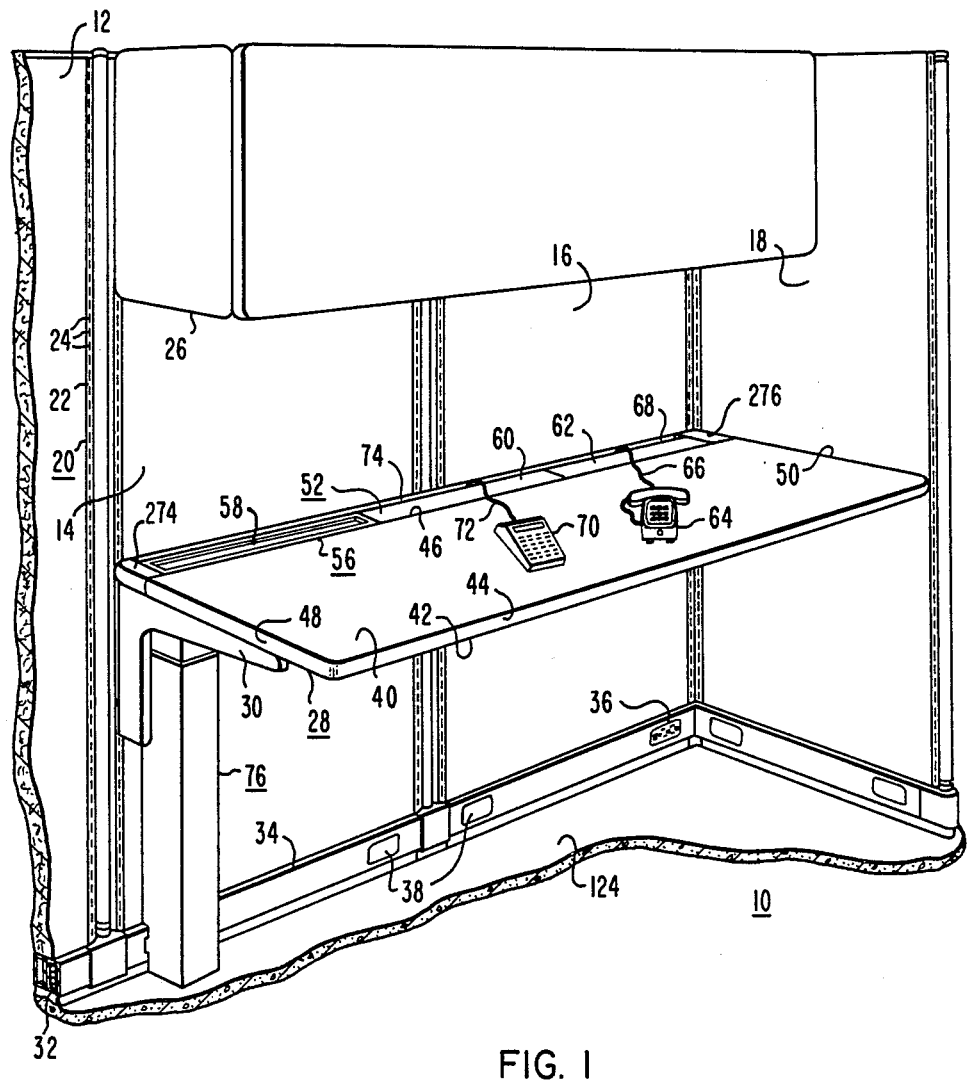
FIG. 1 is a perspective view of a desk and space dividing wall panel arrangement constructed according to the teachings of the invention.

Referring now to the drawings, and to FIG. 1 in particular, there is shown a desk and space dividing wall panel assembly 10 constructed according to the teachings of the invention. Assembly 10 includes a plurality of upstanding space dividing wall panel members, with four panel members 12, 14, 16, and 18 being shown for purposes of example. Wall panel members 12, 14, 16 and 18 may be joined by any suitable arrangement, with the hereinbefore mentioned U.S. Pat. No. 3,762,116 illustrating a joining structure which conceals the joining hardware. U.S. Pat. No. 3,762,116 is hereby incorporated into the specification of the present application by reference. The joining structure of the incorporated patent includes end brackets at each end of each panel. The end brackets have side walls which define a plurality of spaced notches. For example, panel 12 includes an end bracket 20 having a side wall 22 which defines notches 24. The notches 24 serve to mount items such as shelves 26 and a desk 28. Desk 28 may be connected to the panels with any suitable arrangement, such as the cantilever arrangement illustrated which includes cantilever support arms, such as support arm 30. U.S. Pat. No. 3,966,158 illustrates a cantilever arrangement which may be used.

At least certain of the panel members are electrified with a power and communication raceway 32 which is suspended below the bottom edges of the electrified panels and covered with baseboard cover members 34. For example, in FIG. 1 panel members 12, 14 and 16 may be electrified. The hereinbefore mentioned U.S. Pat. No. 4,593,505 discloses a panel base electrical raceway construction which may be used, and said patent is hereby incorporated into the specification of the present application by reference. The baseboard cover members 34 have a plurality of spaced openings sized to snugly surround a power receptacle, such as duplex receptacle 36. The openings which are not used are concealed with cover plates 38.

Desk 28 has upper and lower major opposed surfaces 40 and 42, respectively, with the upper major surface 40 being a work surface. The upper and lower surfaces 40 and 42 are bounded by front and back edges 44 and 46, respectively, and first and second lateral edges 48 and 50, respectively. Desk 28 is spaced from panel members 14 and 16 by an electrical service trough assembly 52 which is fixed to the back edge 46 of desk 28. Electrical service trough assembly 52 includes a trough 54, best shown in FIGS. 2, 3, 4, 5, 8 and 9, and removable cover means 56 on the trough 54 which includes a plurality of independently mounted trough lid assemblies disposed end to end across the length of the trough, such as lid assemblies 58, 60 and 62. As will be hereinafter described, each lid assembly defines a cable opening to trough 54 through which wires may pass from electrical devices disposed on work surface 40 to plug-in electrical and communication receptacles in the trough 54. For purposes of example, a telephone 64 is illustrated having a wire 66 which extends into trough 54 via an opening 68 in lid assembly 62, and a calculator 70 is illustrated having a wire 72 which extends into trough 54 via an opening 74 in lid assembly 60.

Figure 2:
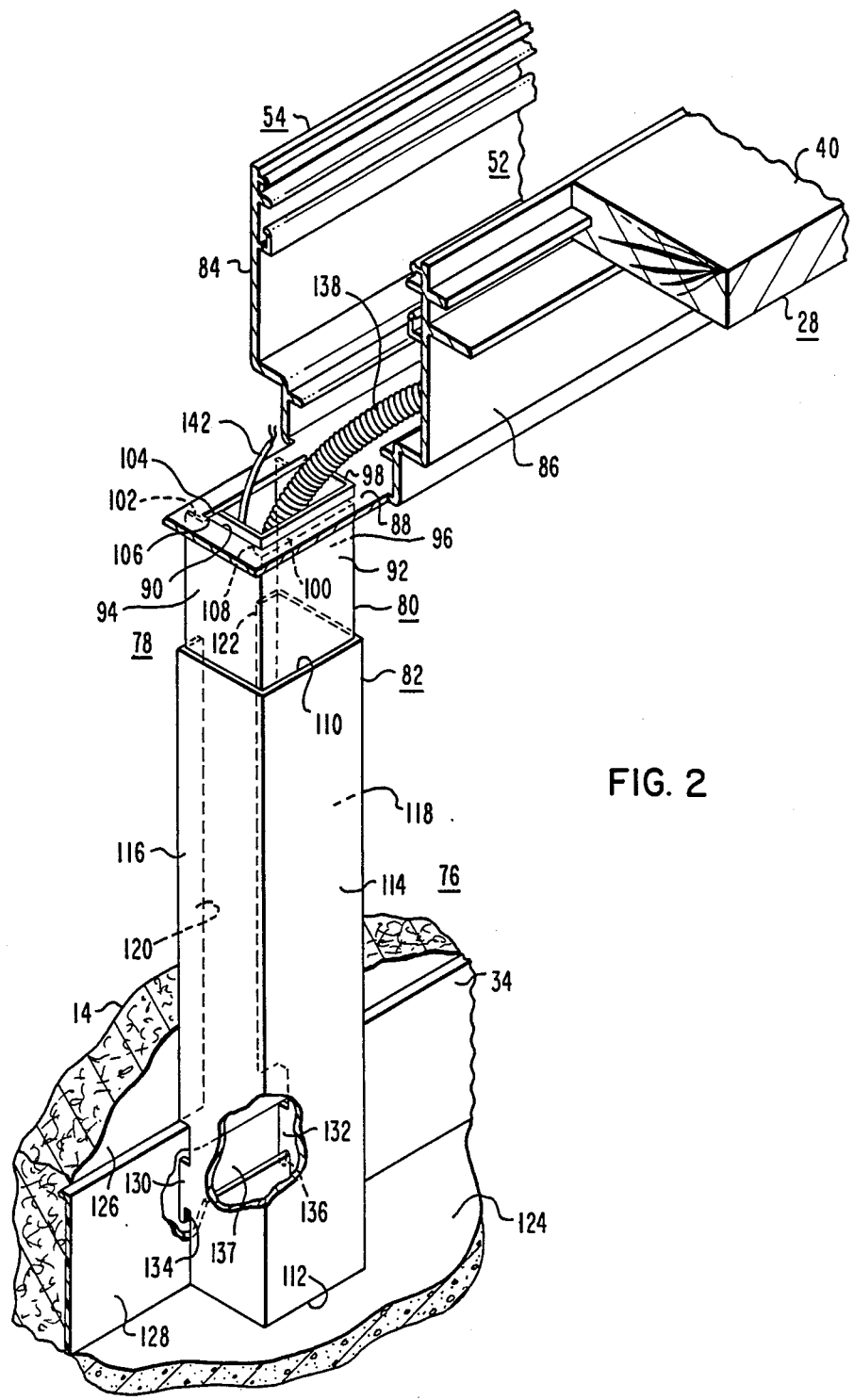
FIG. 2 is a perspective view of an electrical upfeed arrangement shown in FIG. 1, with parts cut away in order to more clearly illustrate a locking and height adjustment arrangement which locks an upfeed housing with an electrical services trough and the baseboard of a wall panel while the housing height is being adjusted to the dimension between the baseboard and trough.

The electrical power and communication circuits in the raceway 32 are electrically connected with appropriate terminal blocks and associated receptacles in the trough 54 via an electrical upfeed assembly 76. As best shown in FIG. 2, which is a perspective view of upfeed assembly 76, baseboard cover 34 and trough 54, the upfeed assembly 76 includes an elongated housing 78 having upper and lower telescopically engaged sections 80 and 82, respectively. Trough 54, which has a generally U-shaped cross sectional configuration, has first and second spaced leg or side portions 84 and 86, respectively, which extend upwardly from a bight or bottom portion 88. Bottom portion 88 defines an opening 90.

The upper section 80 of upfeed housing 78 has a generally U-shaped cross section which includes a bight or front portion 92 and first and second spaced leg or side portions 94 and 96, respectively. The upper section 80 defines an upper end 98 of housing 78, with the upper end 98 being arranged for attachment to trough 54. More specifically, a slot 100 is formed in front 92, with slot 100 extending into sides 94 and 96. Slot 100 is spaced from end 98 by a predetermined dimension. The outer right angle corners of sides 94 and 96 at end 98 are removed and the transition from the resulting "step" is sloped towards front 92 as the transition returns to end 98. For example, an inward step 102 is formed in side 94, and a transition 104 slopes from step 102 to end 98. This will provide clearance for mounting the upper section 80 of the housing 78 to the trough 54 via the trough opening 90. The dimension from the intersection 106 between step 102 and the transition 104, to the end 108 of slot 100, is selected to be substantially the same as the width of opening 90 in the trough bottom 88, measured in a direction between the spaced side portions 84 and 86 of trough 54.

The lower section 82 of upfeed housing 78, which has upper and lower ends 110 and 112, respectively, is also a substantially U-shaped structure in cross section. For example, the lower section 82 includes a bight or front portion 114, and first and second spaced leg or side portions 116 and 118, respectively. The outwardly extended ends of side portions 116 and 118, starting at upper end 110 and extending for a predetermined dimension towards the lower end 112, are bent towards one another to form flanges 120 and 122. The resulting rectangular cross sectional configuration of the lower section 82 is dimensioned to snugly but slidably receive the upper section 80. The predetermined dimension from the lower ends of flanges 120 and 122 to the lower end 112 of housing section 82 is selected to be substantially the same as the dimension from the top edge of the baseboard cover 34 to the floor 124. The edges of side portions 116 and 118 are cut back a predetermined dimension starting at the lower ends of the flanges 120 and 122 to the lower end 112 of housing section 82, except for intermediate portions which include laterally extending locking tabs 130 and 132, respectively. The predetermined dimension by which the edges of side portions 116 and 118 are cut back is the horizontal dimension from the major surface 126 of panel 14 to the vertical surface 128 of the baseboard cover 34. The locking tabs 130 and 132 have vertically extending slots 134 and 136, respectively, accessible from the bottom edge of the associated locking tab, for snugly but slidably receiving the thickness dimension of baseboard cover 34.

Figure 3:
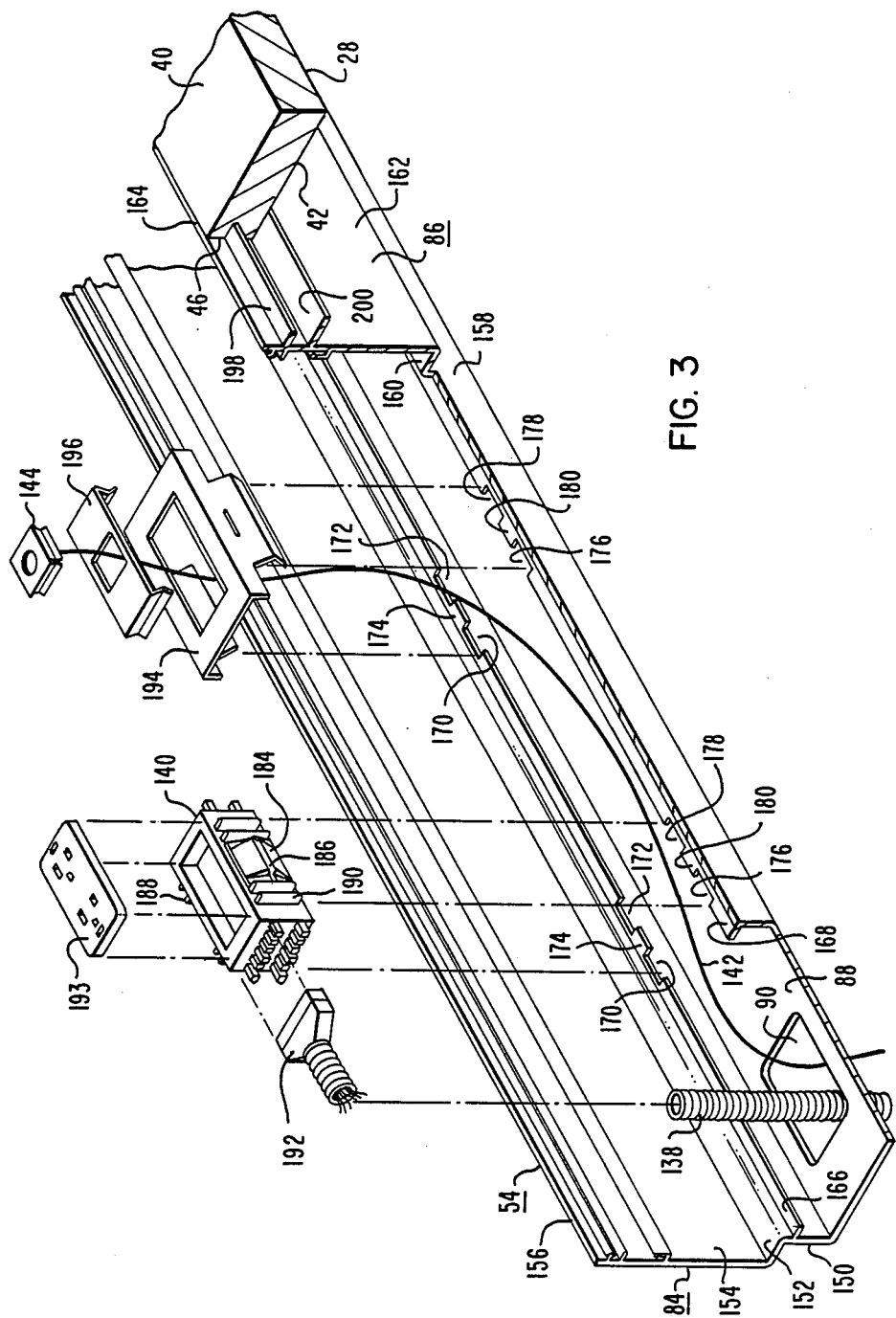
FIG. 3 is an exploded perspective view of an electrical services trough constructed according to the teachings of the invention.
Figure 5:
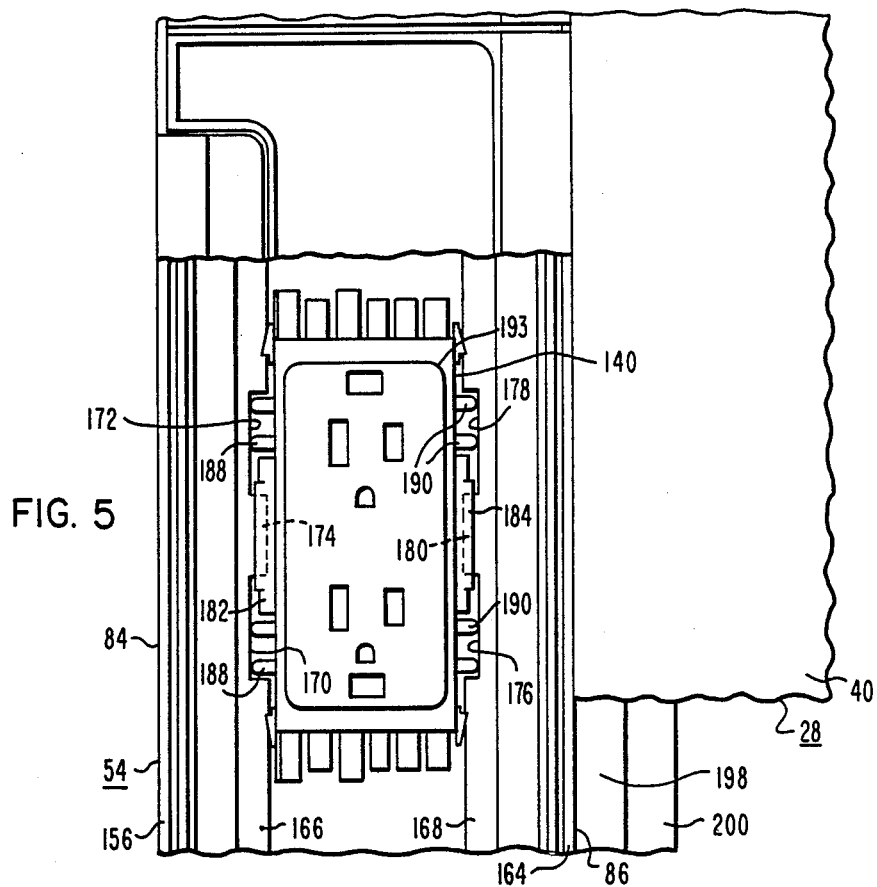
FIG. 5 is a plan view of the electrical services trough shown in FIG. 4.
Figure 4:
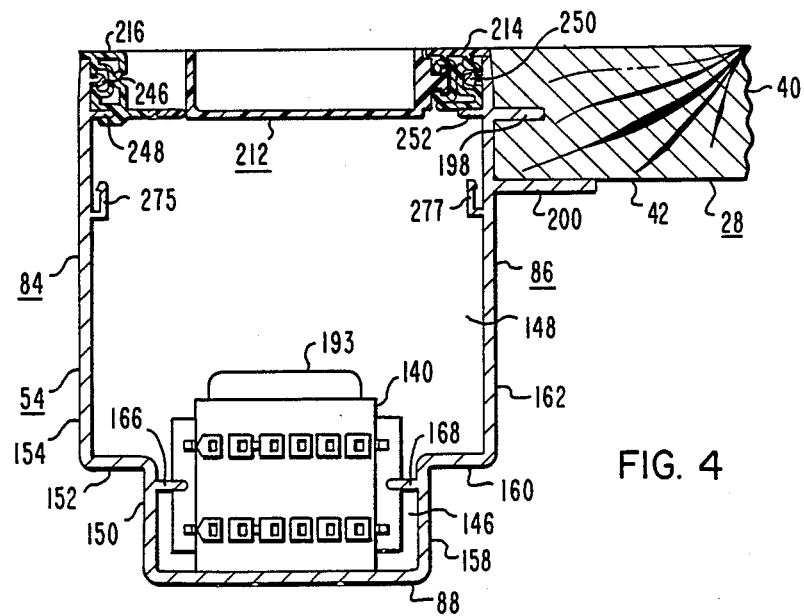
FIG. 4 is a cross sectional view of the electrical services trough shown in FIG. 3, including a cover on the trough.

In the assembly of electrical upfeed means 76, an electrical power jumper cable 138 is connected from the electrical power supply in the baseboard raceway 32 to one or more terminal blocks in electrical service trough 54, such as to terminal block 140 shown in FIGS. 3, 4 and 5. A convenient baseboard connection point is one of the unused openings to the raceway 32, such as opening 137, which may be accessed merely by removing a cover plate 38. The jumper cable 138 would be connected to a plug-in location in the raceway while the baseboard cover 34 is removed, the cable would then be threaded through baseboard opening 137, and the baseboard cover 34 would then be snapped back into the position shown in FIG. 1. The hereinbefore mentioned U.S. Pat. No. 4,278,834 illustrates typical electrical jumper cables which may be used. In like manner, a telephone cable 142 is connected from a telephone circuit in the baseboard raceway 32 to a telephone receptacle or jack, such as telephone jack 144 shown in FIG. 3. If a computer communication network is involved, an appropriate cable would also be connected to provide service from the raceway 32 to the electrical service trough 54.

Electrical upfeed housing 78 conceals the jumper cables quickly and aesthetically by a few simple steps which lock the housing 78 to both the trough 54 and baseboard 34 while simultaneously adjusting the height of housing 78 to the distance from the floor 124 to the trough 54. The first step orients the longitudinal axis of housing 78 at a small acute angle relative to the plane of panel surface 126, with the upper end of the housing being closer to the panel surface 126 than the lower end of the housing, such that the slotted upper end 98 of the upper housing section 80 starts to enter opening 90 in the trough 54. When the entrance to slot 100 in upper housing section 80 is aligned with the bottom 88 of trough 54, the upper end 98 of housing section 80 is moved in a direction away from panel surface 126 to engage the slot 100 with the trough 54 while the lower end 112 of housing 78 is simultaneously pivoted towards the baseboard 34. The lower housing section 82 is then adjusted telescopically relative to the upper housing section 80 to align tabs 130 and 132 with the baseboard opening 137. Housing 78 is moved towards the baseboard 34 to cause the tabs 130 and 132 to enter opening 137, and the lower housing section 82 is moved downwardly to cause slots 134 and 136 in tabs 130 and 132, respectively, to slide down the baseboard cover 34. The downward movement of the lower housing section 82 simultaneously locks housing 78 to both the trough 54 and the baseboard 34 while adjusting the housing length to extend from the floor 124 to the trough 54.

FIG. 3 is a perspective exploded view of trough 54 which illustrates how terminal block 140 and telephone jack 144 may be quickly mounted therein. FIGS. 4 and 5 will also be referred to, with FIG. 4 being a cross sectional view through trough 54 adjacent to a power terminal block 140, and FIG. 5 is a plan view of the trough 54 illustrating terminal block 140. Terminal block 140 used in the trough 54 may be the same as those used in the baseboard raceway 32, as disclosed in the hereinbefore mentioned U.S. Pat. No. 4,634,212. Said patent is hereby incorporated into the present application by reference. Trough 54, which is conveniently in the form of an aluminum extrusion, has a relatively narrow lower section 146 or "pocket" for electrical power jumpers and power terminal blocks, and an upper section 148 for communication cable jumpers. The relatively large upper section also provides ample room for storing the excess lengths of cables which extend into the trough from the work surface 40. The two sections 146 and 148 are formed by "stepping" sides 84 and 86, with side 84 having a lower vertical section 150 which extends vertically upward from bottom portion 88, an outwardly extending portion 152 which is parallel with bottom portion 88, and another vertical section 154 which terminates with an upper edge 156. In like manner, side 86 includes a lower vertical section 158, an outwardly extending portion 160, an upper vertical section 162, and an upper edge 164. Flanges 166 and 168 extend inwardly into lower section 146 from the lower vertical sections 150 and 158, respectively, and the flanges 166 and 168 are provided with receptor notched at spaced locations along the length of the trough 54 for receiving power and communication terminal blocks. For example, each receptor location in flange 166 includes two spaced notches 170 and 172 which define a mounting tab 174, and each receptor location in flange 168 includes two spaced notches 176 and 178 which define a mounting tab 180 which is aligned with mounting tab 174.

Terminal block 140 includes pairs 182 and 184 of flexible tab members on opposite sides thereof which define slots, such as slot 186, for receiving mounting members 174 and 180, respectively, of the electrical service trough 54. The notches in the flanges 166 and 168 receive a plurality of rigid guide fins 188 and 190 disposed on opposite sides of the terminal block 140, with fins 188 being disposed adjacent to pair 182 of flexible tab members, and with fins 190 being disposed adjacent to pair 184 of flexible tab members. The guide fins are spaced and the notches are dimensioned to allow the terminal block 140 to be snapped into position in trough 54 with a single orientation. A female plug 192 on the end of jumper cable 138 is plugged into one end of terminal block 140, and the terminal block is snapped into a receptor position in trough 54. A duplex receptacle 193 is plugged into the terminal block 140. A simple tool may be used to remove terminal block 140 when necessary, which tool depresses the appropriate flexible tabs on each side of the terminal block. Additional terminal blocks similar to terminal block 140 may be snapped into receptor locations and connected together with jumper cables.

The communication jacks may include a metallic base 194 dimensioned to snap into a receptor location, which base may be proivded with an adapter 196 for accommodating the specific type of jack 144 to be mounted in the trough 54.

As shown in FIGS. 3, 4 and 5, vertical section 162 of trough side 86 may be provided with a pair of vertically spaced, horizontally extending flanges 198 and 200 which extend outside the trough for the purpose of fixing the trough 54 to the desk 28. Edge 46 of desk 28, for example, may include a groove for receiving flange 198, and flange 200 may provide support for the lower surface 42 of desk 28.

Trough 54 is provided with removable cover means 202 which, in a preferred embodiment of the invention, includes at least two completely independent lid assemblies disposed end-to-end across the length of the trough. In general the lid assemblies are each similar in construction, differing only in length, with a predetermined number of standard lengths being provided, such as 12 inches and 18 inches. The lid assemblies are disposed on the trough 54 in any combination of lengths to cover all but about the last two inches at each end of the trough 54, with the remaining two inches at each end being completed with end caps, as will be hereinafter explained. The lid assemblies complete the work surface 40 of the desk 24, being essentially flush extensions of the work surface. While all lid sections are similar in construction, each is capable of installation on the trough 54 in one of four different orientations, being reversible top to bottom, and reversible front to back via hinges which mount on either the front or rear edge of the trough 54. Each lid member of each lid assembly has an indented edge to provide access to the trough 54 from the work surface 40, and enable wires to interconnect devices on the work surface 40 with appropriate receptacles in the trough 54. A flexible blade mounts on the side of the trough opposite the lid hinge to close the access opening when not in use, and to close all but a small amount of the opening when a wire is disposed through the opening.

Figure 6:
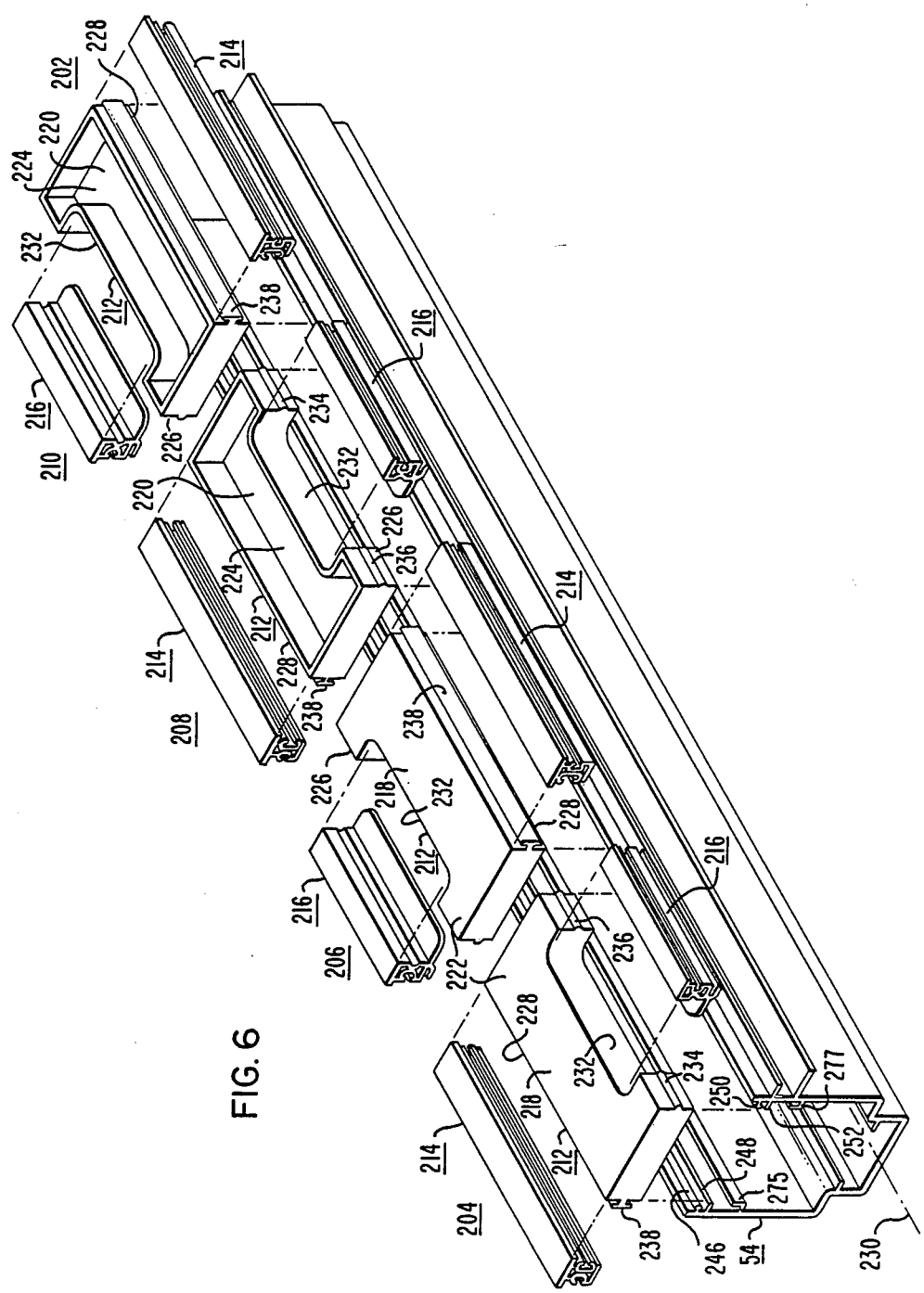
FIG. 6 is a perspective view of a trough having a cover arrangement which includes four similar lids, each in a different orientation, to illustrate the four orientations available for each trough lid.

More specifically, FIG. 6 is an exploded perspective view of trough 54 having cover means 202 in the form of first, second, third and fourth lid assemblies 204, 206, 208 and 210, respectively. While only two lid assemblies would probably be used for most desk widths, four lid assemblies are shown in FIG. 6 in order to illustrate the four different orientations possible for each lid assembly. Since each lid assembly is of like construction except possibly for length, like reference numerals will be used for each assembly.

Each lid assembly includes a trough lid 212, a hinge 214, and a flexible blade 216. Each trough lid has first and second major opposed sides 218 and 220, respectively, with lid assemblies 204 and 206 being shown with the first major side 218 facing upwardly, and with lid assemblies 208 and 210 being shown with the second major side 220 facing upwardly. It will be noted that the first major side 218 has a flat surface 222 while the second major side 220 has a recessed surface 224. Thus, if the user wishes to continue the work surface 40 of the desk 28 substantially uninterrupted across the trough 54, the first major side 218 would be disposed upwardly. If the user wishes to provide space for holding articles, such as pens and pencils, the second major side 220 would be disposed upwardly.

Each lid 212 also has first and second edges 226 and 228, respectively, which are oriented in the same direction as the longitudinal axis 230 of the trough 54. The first edge 226 has an indented portion 232 therein to provide a wire access opening to the trough 54, and small longitudinally extending beads 234 and 236 centrally disposed on the portions of the first edge 226 which are located on each side of the indented portion 232. The second edge 228 has a hinge mounting tab 238 disposed thereon which is symmetrical about an imaginary plane which bisects the lid, with the imaginary plane being disposed parallel with flat surface 222. For example, the hinge mounting tab 238 may have a stem 240 which is attached to the second edge 228, with the stem terminating in similarly dimensioned and configured mounting ears 242 and 244. The lids 212 of lid assemblies 204 and 208 are illustrated with the first edge 226 located along the front edge 164 of trough 54, and the lids 212 of lid assemblies 206 and 210 are illustrated with the second edge 228 located along the front edge 164 of the trough 54. In the former arrangement, the lids 212 hinge along the back edge 156 of trough 54 and provide wire access along the front edge 164, while in the latter arrangement, the lids 212 hinge along the front edge of the trough 54 and provide wire access along the back edge. The choice is up to the user of the desk, as the lid assemblies are easily removed from the trough, the hinges 214 are easily removed from a lid and replaced after the lid has been turned over, if this option is desired, and the flexible blades 216 are easily removed from one trough edge and placed on the other.

In order to accommodate either a hinge 214 or a flexible blade 216 on either the front or rear edge of the trough 54, the trough 54 includes first and second vertically spaced, horizontally extending mounting flanges or protrusions 246 and 248, respectively, on the inner surface of the second vertical section 154 of trough side 84, and first and second mounting flanges or protrusions 250 and 252 on the inner surface of the second vertical section 162 of trough side 86. The first flanges 246 and 250 are similar to one another, and the second flanges 248 and 252 are similar to one another, in location, configuration and dimensions.

Figure 7:
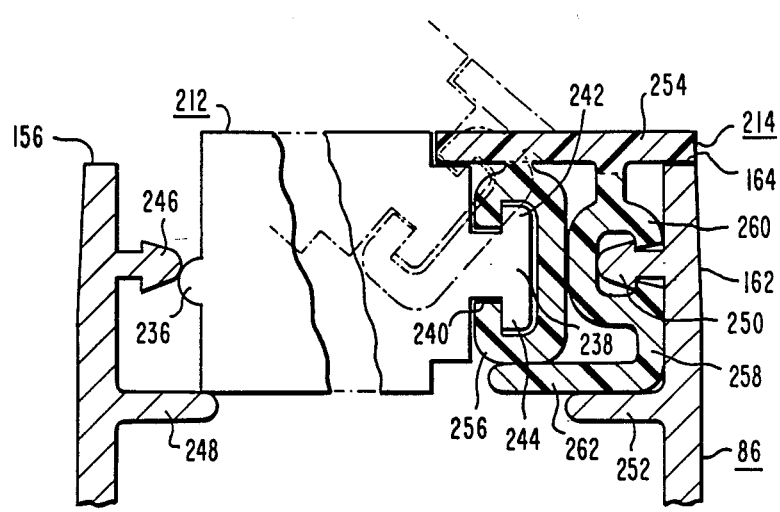
FIG. 7 is a cross sectional view of a hinge constructed according to the teachings of the invention which may be used to connect a trough lid to the trough.

FIG. 7 is a cross sectional view of a hinge 214 which is constructed according to the teachings of the invention, with hinge 214 being illustrated mounted on the front edge 164 of trough 54. It may also be mounted on the rear edge 156, as required. Hinge 214 is preferably a dual durometer plastic extrusion, such as polyvinylchoride, having a resilient or flexible upper portion 254 (70-80 durometer) and first and second spaced rigid portions 256 and 258, respectively, which depend from the upper flexible portion 254. The first rigid portion 256 has a generally C-shaped cross sectional configuration, dimensioned to receive the hinge mounting flange 238 disposed along the second edge 228 of lid 212. The second rigid portion 258 has a first section 260 which is substantially C-shaped in cross sectional configuration, but it has a smaller opening than the C-shaped section of the first rigid portion, being dimensioned to receive the first protrusion or mounting flange 250 of the trough 54. The second rigid portion 258 also has a second section 262 which functions as a support and base for the first rigid portion 256. The second section 262 rests upon the second protrusion 252 of trough 54, and the first rigid portion 256 rests upon the second section 262 when the hinge 214 is unactuated. Hinge 214 may be snapped into position on protrusion 250 or 246, with these mounting flanges and the entrance to the opening of the C-shaped section 260 being shaped to facilitate the "snap" action mounting function. The lid 212 is mounted on the first depending portion 256 by sliding the hinge mounting tab 238 into the C-shaped opening. When the lid 212 is lifted by the user, using the indented edge as a convenient grasping point, the hinge bends in the flexible portion, between the two depending structures 256 and 258, to the position shown in phantom. When lid 212 is in the closed position, beads 234 and 236 on the edge opposite to the hinge 214 form a slight interference fit with the first flange 246 on the opposite side of trough 54, while the lower surface of the lid 212 rests against the second flange 248.

Figure 8:
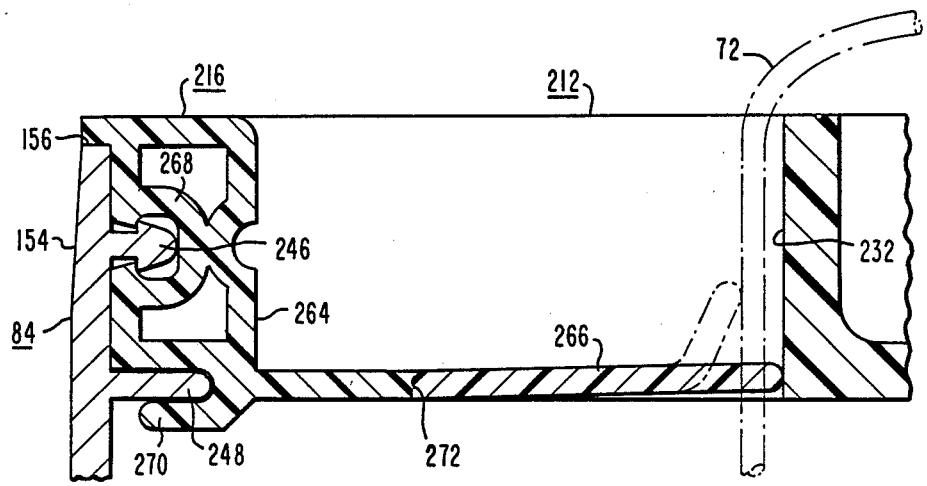
FIG. 8 is a cross sectional view of a flexible blade or flap constructed according to the teachings of the invention which may be used to cover the wire opening to the electrical services trough.

FIG. 8 is a cross sectional view of a flexible flap or blade 216 constructed according to the teachings of the invention, with flexible flap 216 being illustrated mounted on the rear edge 156 of trough 54. It may also be mounted on the front edge 164, as required. Flexible flap 216 is preferably a dual durometer plastic extrusion, such as polyvinylchloride, having a rigid mounting portion 264 and a resilient, flexible flap or blade 266. The rigid mounting portion 264 includes a section 268 which is sized to be snapped over the first flange 246, and a section 270 having an opening for receiving the second flange 248. The rigid portion 264 also forms the base or entrance to the flexible flap or blade portion 266, interfacing therewith at location 272. The flexible blade 266 normally closes the opening to trough 54, extending to the indented surface 232 of the cover 212. When a wire 72 extends between the trough 54 and the work surface 40, the flexible blade 266 flexes locally, adjacent to the wire to allow it to pass, while substantially closing the remaining portion of the opening.

Figure 9:
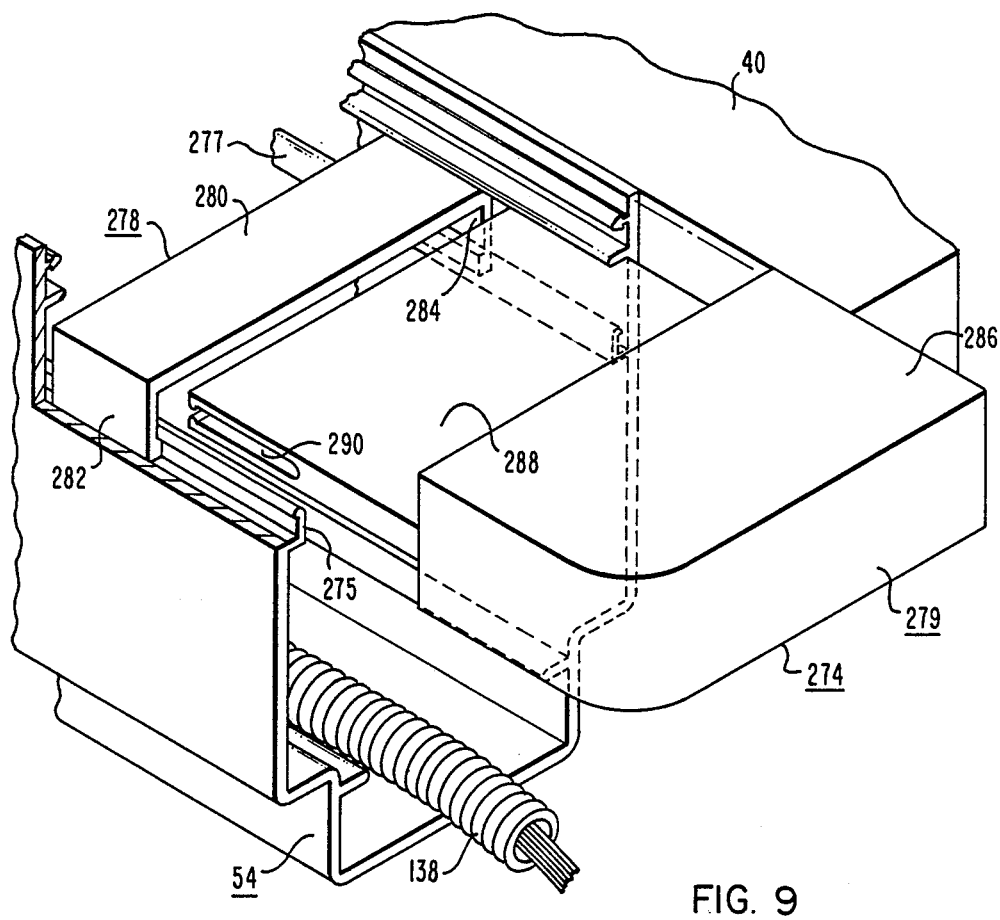
FIG. 9 is a perspective view of one end of the electrical services trough, illustrating an end cap for the trough constructed according to the teachings of the invention.

As hereinbefore stated, the cover means 202 preferably does not extend from one end to the other end of the trough 54, with the lid assemblies being selected to allow about two inches at each end of trough 54 uncovered. These uncovered sections are filled with end cap assemblies 274 and 276, as shown in FIG. 1. The end cap assemblies 274 and 276 close the upper portion of the trough 54, while leaving the lower portion of the trough 54 open to allow power and communication cables to extend from one desk to another adjacent desk, if desired. FIG. 9 is an exploded perspective view of end cap assembly 274, illustrating a two piece construction having first and second parts 278 and 279 which may be used for adjustably mounting end cap assembly 274 to trough 54. Trough 54 includes mounting hooks 275 and 277 which project inwardly from the inner surfaces of first and second sides 84 and 86 of trough 54. The first part 278 of the end cap assembly 274 is engaged with the mounting hooks 275 and 277. The first part 278 is in the configuration of an inverted U, having a bight 280 and first and second depending leg portions 282 and 284, respectively. The first part 278 is placed at the end of the trough 54 and then slid into position on the hooks 274 and 276. The depending leg portions 282 and 284 may have barbs which cooperate with barbs at the ends of the hooks 274 and 276, to prevent the first piece 278 from being lifted out of position. The second part 279 of the end cap assembly 274 has an upper surface 286 which forms a continuation of the work surface 40 of desk 24, and it has a thickness dimension which is the same as the thickness dimension of desk 24. The end of the second part 279 which faces the trough 54 includes an extension 288 having an opening 290 which snaps over bight 280 of the first part 278 of the end cap assembly 274. Thus, the second part 279 may be snapped on to the first part 278 and the assembly moved together to cause the second portion to snug up against the end of the adjacent lid assembly. While the top portion of the trough 54 is covered by the end cap assemblies, and the lower portion is at least partially concealed from view by the desk mounting arrangement, such as cantilever arms, the trough 54 is still sufficiently open to allow electrical cables, such as cable 292, to extend from one trough to another adjacent trough associated with an adjacent desk.

While desk 28 is preferably used in combination with a space dividing wall panel arrangement, as hereinbefore described, the aspects of the invention which relate to the cover means 56 for the trough 54 are applicable to an electrified desk without regard to the means used for supporting the desk, and without regard to where the electrical wiring is obtained which enters opening 90 in the trough 54.

We claim:

1. A desk and space dividing panel assembly, comprising:

a space dividing panel having a base, an electrical raceway at the base of said panel which includes electrical wiring, a desk having a predetermined width dimension, said desk being supported at least in part by said space dividing panel, said desk having upper and lower major opposed surfaces, with the upper surface being a work surface, said upper and lower surfaces being bounded by front and back edges and first and second lateral edges, an elongated trough supported by said desk, said trough having first and second ends and a longitudinal axis which extends between said ends, said trough having a substantially U-shaped cross sectional configuration, including a bight portion and first and second spaced upstanding leg portions having upper edges which define first and second lateral edges, respectively, disposed substantially in the plane of the work surface, a terminal block in said trough, electrical upfeed means which extends between said electrical raceway and said trough, said electrical upfeed means including electrical wiring which interconnects the electrical wiring in said raceway with said terminal block, said electrical upfeed means including an elongated housing having upper and lower ends and a longitudinal axis which extends between said ends, said housing surrounding the wiring which interconnects the wiring in the raceway with the terminal block, said housing having upper and lower telescopically engaged sections respectively fixed to the trough and space dividing panel with a locking arrangement which is actuated simultaneously with adjustment of the housing length to the dimension between the raceway and the trough, and cover means on said trough which forms an extension of said work surface, said cover means defining an opening to said trough for accommodating an electrical wire between said terminal block and an electrical device on said work surface.

2. The assembly of claim 1 wherein the terminal block and the trough are cooperatively configured to enable the terminal block to be snapped into engagement with the trough at different positions along the length of the trough.

3. The assembly of claim 1 wherein the trough is fixed to the back edge of the desk.

4. The assembly of claim 1 wherein the bight portion of the trough includes a bottom portion of the trough, with said bottom portion defining an opening to the trough, and wherein the upper section of the upfeed housing extends into the trough through the opening in the bottom portion of the trough, with the upper section of the housing being slotted such that the bottom portion of the trough extends into the slotted portion of the upper housing to removably fix the upper section of the housing to the trough.

5. The assembly of claim 4 wherein the raceway at the base of the space dividing panel includes a baseboard which defines a baseboard opening, and wherein the lower section of the housing includes a pair of spaced tabs facing the baseboard which extend into said baseboard opening, said pair of spaced tabs including slots, with the lower section of the housing being telescoped downwardly to engage the baseboard via said slots and simultaneously fix the housing to the baseboard and trough.

6. The assembly of claim 5 wherein the baseboard opening is dimensioned to provide the dual functions of receiving a power terminal block and receptacle, or an electrical upfeed housing.

7. The assembly of claim 1 wherein the cover means includes an elongated lid member and hinge means, said lid member having first and second major opposed sides, first and second ends, and first and second lateral edges which extend between the first and second ends, said first lateral edge of the lid member and said hinge means being cooperatively configured to enable said hinge means to be assembled with said lid member with either major side of the lid member facing upwardly.

8. The assembly of claim 7 wherein the second lateral edge of the lid member is indented to define a wire opening to the trough.

9. The assembly of claim 7 wherein the cooperative configuration of the first lateral edge of the lid member and the hinge member includes a tab on the first lateral edge of the lid member which is symmetrical about a plane disposed midway between and parallel with the first and second major opposed sides of the lid member.

10. The assembly of claim 7 wherein the hinge means is a dual durometer extrusion.

11. The assembly of claim 1 wherein said cover means includes a flexible member which closes the opening to the trough in the absence of an electrical wire in the opening, said flexible member locally flexing to accommodate an electrical wire in the opening while substantially closing the remaining portion of the opening.

12. The assembly of claim 11 wherein the flexible member is fixed to the trough.

13. The assembly of claim 11 wherein the flexible member is a dual durometer extrusion.

14. A desk and space dividing panel assembly, comprising:
a space dividing panel having a base, an electrical raceway at the base of said panel which includes electrical wiring,
a desk having a predetermined width dimension,
said desk being supported at least in part by said space dividing panel,
said desk having upper and lower major opposed surfaces, with the upper surface being a work surface, said upper and lower surfaces being bounded by front and back edges and first and second lateral edges,
an elongated trough supported by said desk,
said trough having first and second ends and a longitudinal axis which extends between said ends,
said trough having a substantially U-shaped cross sectional configuration, including a bight portion and first and second spaced upstanding leg portions having upper edges which define first and second lateral edges, respectively, disposed substantially in the plane of the work surface,
a terminal block in said trough,
electrical upfeed means which extends between said electrical raceway and said trough,
said electrical upfeed means including electrical wiring which interconnects the electrical wiring in said raceway with said terminal block,
and cover means on said trough which forms an extension of said worksurface,
said cover means defining an opening to said trough for accommodating an electrical wire between said terminal block and an electrical device on said worksurface,
said cover means including an elongated lid member and hinge means, said lid member having first and second major opposed sides, first and second ends, and first and second lateral edges which extend between the first and second ends,
said first lateral edge of the lid member and said hinge means having cooperatively configured intergaging elements which are symmetrical above and below a central axis to enable said hinge means to be assembled with said lid member with either major side of the lid member facing upwardly.

15. The assembly of claim 14 wherein the second lateral edge of the lid member is indented to define a wire opening to the trough.

16. The assembly of claim 14 wherein the cooperative configuration of the first lateral edge of the lid member and the hinge member includes a tab on the first lateral edge of the lid member which is symmetrical about a plane disposed midway between and parallel with the first and second major opposed sides of the lid member.

17. The assembly of claim 14 wherein the hinge means is a dual durometer extrusion.

18. A desk assembly, comprising:
a desk having a predetermined width dimension,
support means for said desk,
said desk having upper and lower major opposed surfaces, with the upper surface being a work surface, said upper and lower surfaces being bounded by front and back edges and first and second lateral edges,
an elongated trough supported by said desk,
said trough having first and second ends and a longitudinal axis which extends between said ends,
said trough having a substantially U-shaped cross sectional configuration, including a bight portion and first and second spaced upstanding leg portions having upper edges which define first and second lateral edges, respectively, disposed substantially in the plane of the work surface,
a terminal block in said trough,
and cover means on said trough which forms an extension of said worksurface,
said cover means defining an opening to said trough for accommodating an electrical wire between said terminal block and an electrical device on said worksurface,
said cover means including an elongated lid member and hinge means, said lid member having first and second major opposed sides, first and second ends, and first and second lateral edges which extend between the first and second ends,
said first lateral edge of the lid member and said hinge means having cooperatively configured intergaging elements which are symmetrical above and below a central axis to enable said hinge means to be assembled with said lid member with either major side of the lid member facing upwardly.

19. The assembly of claim 18 wherein the second lateral edge of the lid member is indented to define a wire opening to the trough.

20. The assembly of claim 18 wherein the cooperative configuration of the first lateral edge of the lid member and the hinge member includes a tab on the first lateral edge of the lid member which is symmetrical about a plane disposed midway between and parallel with the first and second major opposed sides of the lid member.

21. The assembly of claim 18 wherein the hinge means is a dual durometer extrusion.

* * * * *